(12) United States Patent
Huang et al.

(10) Patent No.: US 8,897,821 B2
(45) Date of Patent: Nov. 25, 2014

(54) METHOD FOR PROVIDING VISUAL EFFECT MESSAGES AND ASSOCIATED COMMUNICATION SYSTEM AND TRANSMITTING END

(75) Inventors: Chih-Hsien Huang, New Taipei (TW); Sheng-Chi Yu, New Taipei (TW)

(73) Assignee: MStar Semiconductor, Inc., Hsinchu (TW)

( * ) Notice: Subject to any disclaimer, the term of this patent is extended or adjusted under 35 U.S.C. 154(b) by 0 days.

(21) Appl. No.: 13/450,621

(22) Filed: Apr. 19, 2012

(65) Prior Publication Data

US 2012/0289262 A1 Nov. 15, 2012

(30) Foreign Application Priority Data

May 13, 2011 (TW) .............................. 100116932 A

(51) Int. Cl.
*H04W 4/00* (2009.01)
*H04M 1/725* (2006.01)

(52) U.S. Cl.
CPC ...... *H04M 1/72555* (2013.01); *H04M 1/72544* (2013.01); *H02W 4/12* (2013.01)
USPC ............................ 455/466; 345/473; 345/475

(58) Field of Classification Search
CPC ....... H04W 80/12; H04W 88/02; H04W 4/12; H04W 4/14; H04W 4/20
See application file for complete search history.

(56) References Cited

U.S. PATENT DOCUMENTS

| 2008/0049025 | A1* | 2/2008 | Le Tuan | 345/473 |
| 2008/0204362 | A1* | 8/2008 | Lessing et al. | 345/30 |
| 2008/0220797 | A1* | 9/2008 | Meiby et al. | 455/466 |
| 2008/0280633 | A1* | 11/2008 | Agiv | 455/466 |
| 2011/0047476 | A1* | 2/2011 | Hochmuth et al. | 715/744 |

FOREIGN PATENT DOCUMENTS

| CN | 1294722 A | 5/2001 | |
| CN | 1105462 C | 4/2003 | |
| WO | WO 2008054062 A1 * | 5/2008 | H04B 1/40 |

OTHER PUBLICATIONS

State Intellectual Property Office of the People's Republic of China, "Office Action", Aug. 1, 2013.

* cited by examiner

*Primary Examiner* — Amancio Gonzalez
(74) *Attorney, Agent, or Firm* — WPAT, PC; Justin King

(57) ABSTRACT

A method for providing visual effect messages on a receiving end and associated transmitting end configuration is provided. At the transmitting end, visual effect positions and visual effects of messages are determined according to an input message. The visual effect positions and visual effect information are transmitted to the receiving end, and are displayed at the visual effect positions at the receiving end according to the visual information.

23 Claims, 4 Drawing Sheets

METHOD FOR PROVIDING VISUAL EFFECT MESSAGES AND ASSOCIATED COMMUNICATION SYSTEM AND TRANSMITTING END

This application claims the benefit of Taiwan Patent Application Serial No. 100116932, filed May 13, 2011, the subject matter of which is incorporated herein by reference.

BACKGROUND OF THE INVENTION

1. Field of the Invention

The present disclosure relates in general to a method for providing visual effect messages in an associated communication system and transmitting end, and more particularly to a method for providing messages of diversified visual effects by utilizing a small message transmission mechanism in an associated communication system and transmitting end.

2. Description of Related Art

Apart from audio communications, communication systems also provide non-audio message services such as text and/or graphics short messages. For example, text of a message is inputted at a transmitting end by a user, and is transmitted in packets of predetermined message communication protocols to a receiving end via communication services of a communication system, so as to allow a user at the receiving end to read the text transmitted from the transmitting end. However, in typical conventional techniques, text messages are only monotonous text or graphics lacking in visual variations and interactivity ability.

SUMMARY OF THE INVENTION

The present disclosure is directed to a technique for providing messages with visual effects to increase diversity and interactivity of the message communication utilized in a communication system.

According to an aspect of the present disclosure, a method for providing a visual effect message in a communication system is provided. The method may comprise: receiving an input message at a transmitting end, determining a plurality of visual effect positions according to the input message and providing visual information corresponding to a visual effect (e.g., a particle system visual effect), encoding the visual effect positions and visual information into encoded information and transmitting the encoded information to a receiving end, decoding the encoded information to retrieve the visual effect positions and visual effect information at the receiving end, and displaying the visual effect at the visual effect positions according to the visual effect information to display the visual effect message.

According to another aspect of the present disclosure, a communication system for providing a visual effect message is provided. The communication system may comprise: a transmitting end and a receiving end. The transmitting end comprises an input module, a visual effect editing module, an encoding module, and a first communication module. The receiving end comprises a second communication module, a decoding module, and a display module.

At the transmitting end, the input module receives an input message, and the visual effect editing module provides a plurality of visual effect positions according to the input message and provides corresponding visual effect information. The encoding module encodes the visual effect positions and the visual effect information into encoded information, which is then transmitted by the first communication module.

At the receiving end, the second communication module receives the encoded information, and the decoding module decodes the encoded information to retrieve the visual effect positions and the visual effect information from the encoded information. The display module performs visual effect rendering at the visual effect positions according to the visual effect information to display a corresponding visual effect.

According to yet another aspect of the present disclosure, a transmitting end of a communication system for providing a visual effect message is provided. The transmitting end may comprise: a touch screen, a visual effect editing module, a first communication module, and an encoding module. The touch screen receives an input message. The visual effect editing module, coupled to the touch screen, provides a plurality of visual effect positions according to the input message, and provides visual information corresponding to the visual effect positions. The touch screen displays a corresponding visual effect at the visual effect positions according to the visual effect information. The first communication module transmits the visual effect positions and the visual effect information according to a corresponding communication protocol to a receiving end. The encoding module encodes the visual effect positions and the visual effect information into encoded information, such that the visual effect positions and the visual effect information transmitted by the first communication module are the encoded information.

In an embodiment, the visual effect information is particle system mode visual effect information, and the visual effect positions correspond to a plurality of coordinates on a coordinate plane. In an embodiment, a plurality of coordinates obtained by same-finger touch control are defined as a visual effect position. In an embodiment, the transmitting end and/or the receiving end displays the corresponding visual effect by calculating particle parameters of a plurality of particles generated by the visual effect positions on a page and drawing the particles via a graphic database according to the particle parameters to display the particles on the page. In an embodiment, the communication system is at least one of a GSM system, a CDMA/WCDMA system, an LTE system, a WiMAX system, and an Internet system, but such communication frameworks should not be limited to these specific types.

The above and other aspects of the invention will become better understood with regard to the following detailed description of the preferred but non-limiting embodiments. The following description is made with reference to the accompanying drawings.

DETAILED DESCRIPTION OF THE PREFERRED EMBODIMENTS

Figure 1:
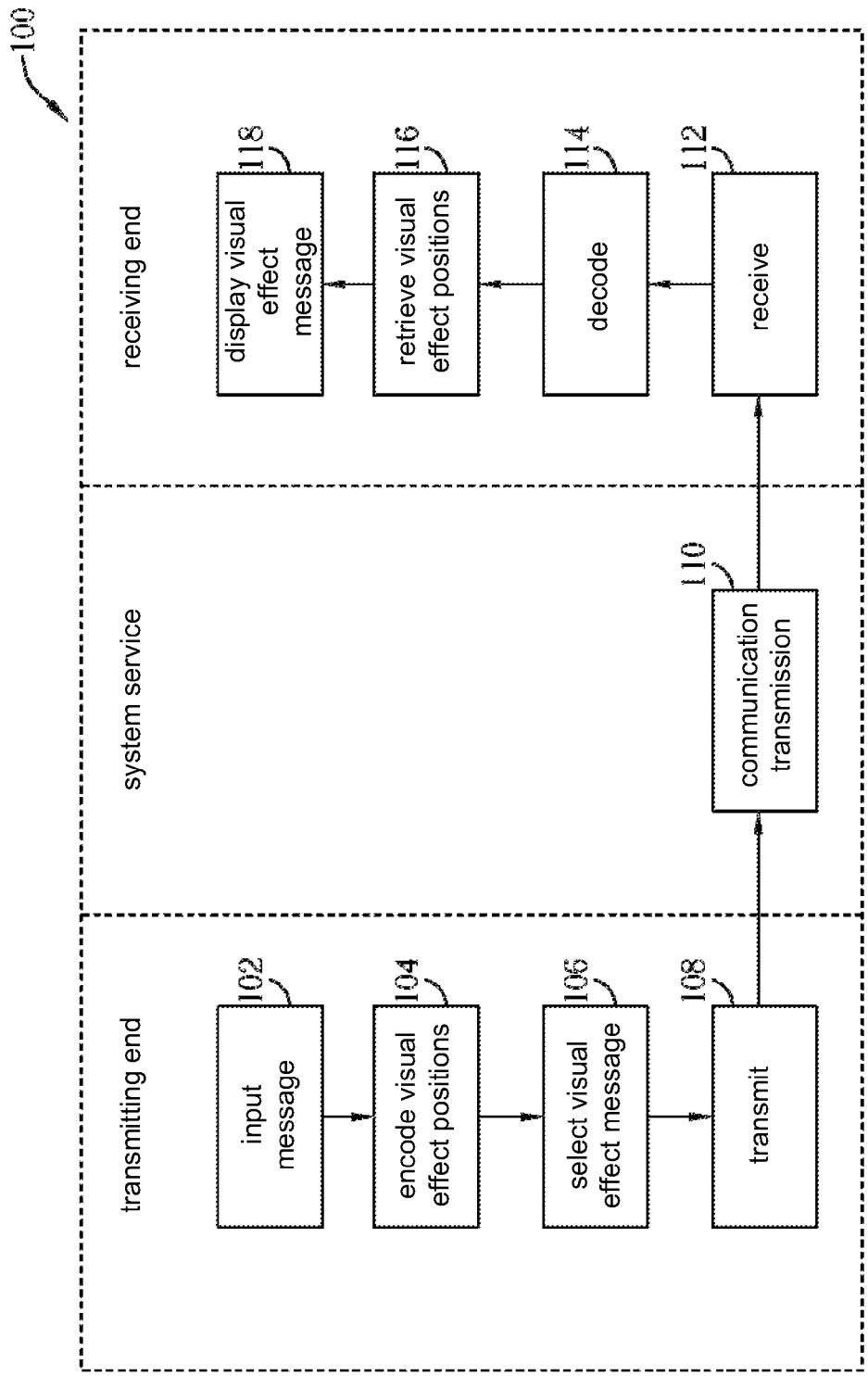
FIG. 1 is a schematic diagram of a flow according to an embodiment of the present disclosure.
Figure 2:
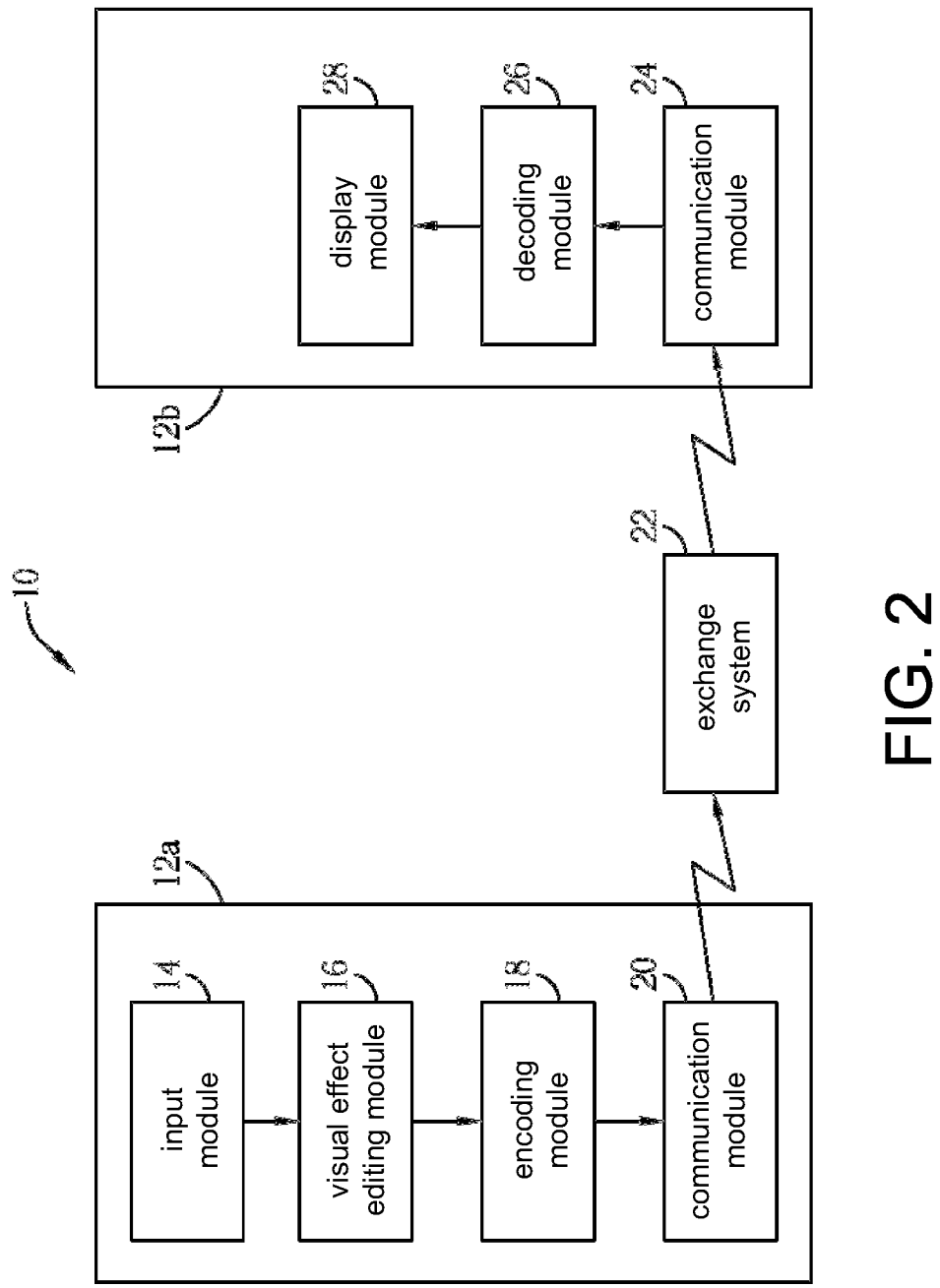
FIG. 2 is a schematic diagram of a communication system according to an embodiment of the present disclosure.
Figure 3:
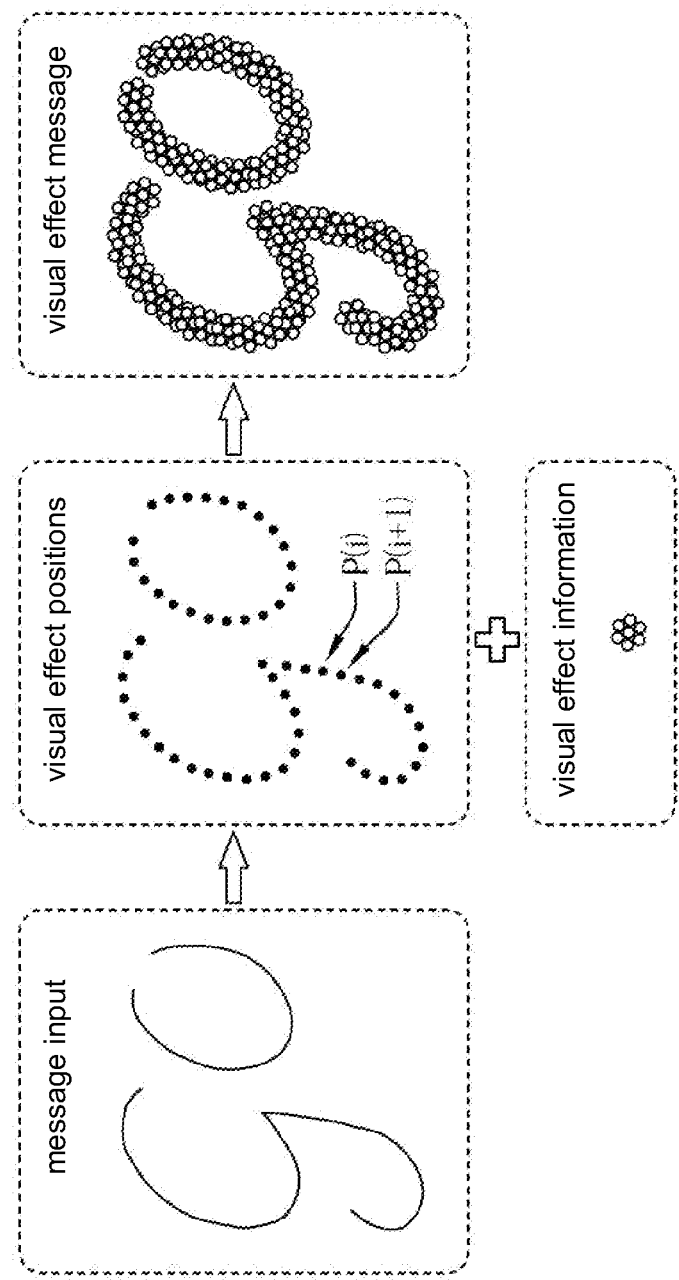
FIG. 3 shows formation of a visual effect message according to an embodiment of the present disclosure.

FIG. 1 shows a schematic diagram of a flow 100 for providing a visual effect message according to an embodiment of the present disclosure. FIG. 2 shows a schematic diagram of a communication system 10 according to an embodiment of the present disclosure; the communication system 10 may realize the flow 100. FIG. 3 shows a schematic diagram of a formation of a visual effect message according to an embodiment of the present disclosure. The communication system 10 in FIG. 2 comprises two terminals 12a and 12b. For example, the communication system 10 is a wireless audio mobile communication system, and provides system services including routing, exchange, and transmission between the two terminals 12a and 12b via an exchange system 22. To realize communication, the terminals 12a and 12b respectively comprise communication modules 20 and 24 for transmitting and receiving communication signals. Serving as a transmitting end of visual effect messages, the terminal 12a further comprises an input module 14, a visual effect editing module 16, and an encoding module 18. Correspondingly, the terminal 12b is a receiving end comprising a decoding module 26 and a display module 28.

The flow 100, performed by the communication system 10, comprises steps to be described below in further detail.

In Step 102, an input message is received to provide a message content, and a corresponding visual effect is determined. At the terminal 12a, the input module 14 receives the input message from a user via a keyboard, a cursor device, and/or a touch sensor. For example, a content of a text message is inputted by a user at the terminal 12a via a keyboard; alternatively, text and/or graphics are written by a user comprising message content via touch control or other means. For example, the input module 14 may comprise a touch screen. Alternatively, one or multiple input messages comprising predetermined contents are built-in (i.e., stored in) the terminal 12a for a user to select from. The input message may be static or dynamic. For example, each input message may comprise a plurality of frames respectively comprising different contents to composite a dynamic message.

Upon obtaining the input message the visual effect editing module 16 provides a plurality of visual effect positions and visual information according to the input message. With reference to FIG. 3, to provide a visual effect message, the visual effect module 16 defines a plurality of visual effect positions (e.g., P(i) and P(i+1)) according to text and/or graphics of the input message. It is the spirit of the present disclosure to display visual effects at the visual effect positions to present a visual effect message. Therefore, the visual effect editing module 16 provides the corresponding visual effect information of the visual effect to be presented at the visual effect positions. For example, the visual effect is a particle system visual effect. The particle system is a system that presents a visual effect by simulating micro particles in a three-dimensional graphics space, and such visual effect may include glittering fireworks, smoke, snowflakes, stardust, clouds and fogs, fireflies, and/or bubbles. The visual effect information is for defining parameters of the particle system visual effect, e.g., parameters of initial positions, spawning rate, initial velocity vector, types, shapes, colors, sizes, density, brightness, distribution range, lifespan, and fuzzy parameters of the particles. For example, the lifespan of the particle system is a period between a start time to an end time for presenting a special effect or a fade-in time to a fade-out time of the particles, and/or a lasting period of the particles.

In an embodiment, the spawning rate represents the number of particles generated within a unit time, the initial velocity vector represents an initial velocity at the time when the particles are generated, and the fuzzy parameter represents a tolerable variation range for the visual effects produced by the parameters when the above values of parameters are regarded as a center. For example, for a particle having a lifespan of 50 frames, 20% as the fuzzy parameter means that the lifespan of the particle varies between 40 and 60 frames. The initial position is an initial position at the time when the particle is generated, and is also referred to as an emitter of the particle.

The visual effect module 16 may automatically define coordinates of the visual effect positions along geometric coordinates of the input message according to a predetermined algorithm, and provide a visual effect editing interface that allows a user to select parameters of visual effects as well as providing a preview of the visual effect message. Alternatively, the visual effect editing module 16 allows a user to tune the visual effect position, or edit/select a background such as color, effect, graphics, texture, and/or patterns of the message to incorporate associated information of the background to the visual effect information.

In Step 104, the encoding module 18 consolidates and encodes the visual effect positions and the visual effect information to corresponding encoded information. For example, an encoding approach similar to the run length coding is implemented to compress and encode the visual effect positions and the visual effect information to reduce the message transmission amount of the visual effect positions and the visual effect information. The encoded information may be regarded as a draft of the visual effect message and is stored in the terminal 12a.

In Step 106, the visual effect message to be sent out is selected by the user. For example, the user selects the visual effect message to be sent out from the previously stored visual effect message draft.

In Step 108, the communication module 20 in the terminal 12a transmits the encoded information. For example, the communication module 20 packages the encoded information to communication signals according to a predetermined message communication protocol, and transmits the communication signals to the exchange system 22 in the communication system 10. For example, the exchange system 22 is at least one of a GSM system, a CDMA/WCDMA system, an LTE system, a WiMAX system, and an Internet system.

In Step 110, the exchange system 22 in the communication system 10 provides communication transmission services to transmit the communication signals from the terminal 12a to the terminal 12b. For example, the exchange system 22 is provided with a base station and an exchange server (not shown) to realize routing, exchange, and transmission of the communication signals.

In Step 112, the communication module 24 in the communication system 12b receives and decodes the communication signals from the terminal 12a to retrieve the encoded information. The communication module 24 complies with the same message communication protocol as the communication module 20 so as to correctly retrieve the encoded information of the visual effect message from the communication signals.

In Step 114, the decoding module 26 decodes the encoded information to retrieve the visual effect positions and the visual effect information. The encoding module 18 and the decoding module 26 comply with the same encoding and decoding protocol so as to allow the decoding module 26 to correctly retrieve the visual effect positions and the visual effect information from the encoded information.

In Step 116, the display module 28 performs rendering and displays the visual effect at the visual effect positions according to the visual effect information to present the visual effect message to the user at the terminal 12b, so as to accomplish the visual effect message transmission.

Figure 4:
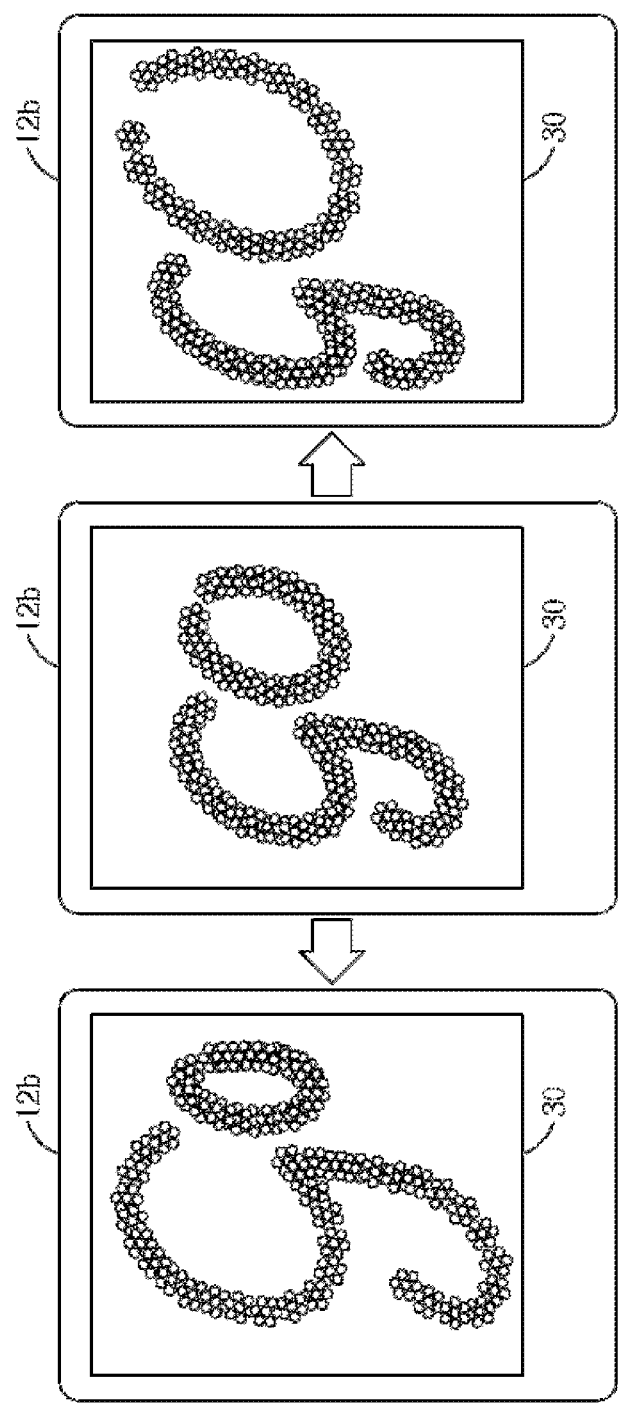
FIG. 4 is a schematic diagram of providing an interactive visual effect message according to an embodiment of the present disclosure.

The visual effect positions and the visual effect of the visual effect information may be 2D or 3D, and the user at the terminal 12b may adjust an angle and a position of the visual effect message. For example, as shown in FIG. 4, when the visual effect message is displayed by the terminal 12b at a monitor 30, the user is capable of assigning a display angle of the visual effect message to interact with the visual effect message. Alternatively, the terminal 12b may automatically adjust the angle of the visual effect message to dynamically display the visual effect message.

In the embodiment shown in FIG. 2, the modules in the terminals 12a and 12b may be realized by software, firmware, and/or hardware, and any combination thereof. For example, the display module 28 is a hardware accelerating circuit with 3D graphic processing capabilities to quickly process the particle system visual effect in real time. The terminal 12a may also be provided with the decoding 26 and the display module 28, and the terminal 12b may also be provided with the input module 14, the visual effect editing module 16 and the encoding module 18, so that the terminal 12b may also transmit visual effect messages to the terminal 12a. For example, the terminals 12a and 12b are mobile phones both supporting a same communication protocol, portable computers, PDAs, digital cameras, digital camcorders, or digital frames.

With reference to FIG. 3, a process of converting text or line patterns to a particle system shall be described. In FIG. 3, a touch screen serving as a message input interface comprises a plurality of pixels, and may have a 640×480, 1024×768, or 1280×1024 pixel distribution combination according to a resolution of the touch screen, although any resolution and type of display and input device is likewise suitable. According to the pixel distribution, a predetermined pixel may be determined as a point on a coordinate axis to define a 2D coordinate plane. When the touch screen is touched by a user, a coordinate corresponding to the touched position is recorded to present different textures or color levels from a background at a corresponding pixel.

The coordinate corresponding to the touched position is stored as an initial position of the particle system. The coordinates may be defined with different spawning rates, initial velocity vectors, particle graphic patterns and lifespans, so as to present visual effects including glittering fireworks, smoke, snowflakes, stardust, clouds and fogs, fireflies, and bubbles according to the aforementioned parameters. The aforementioned parameters may be defined as particle parameters of the particles.

The particle system according to the embodiment of the present disclosure sequentially updates particle conditions displayed by each frame according to a frame update rate. A corresponding display step may be in large divided into a simulation stage and a display stage. In the simulation stage, according to different spawning rates, a coordinate of at least one particle is defined, to which corresponding type, shape, color, size, density, brightness, distribution range, lifespan, and fuzzy parameter are assigned according to the parameters of the coordinate. Each time the frame is updated, all existing particles are checked to determined whether their lifespans are fulfilled/exceeded. For example, when a predetermined particle is fulfilled or its lifespan exceeded, the particle and related parameters are removed so it is no longer displayed on the screen during the display stage. Further, collisions and simulations between the particles and between the particles and the background are also processed in the simulation stage. Therefore, operations of the particles to be displayed in a next frame are completed in the simulation stage of the particles and stored, so as to display the particles on the screen in the display stage.

In the display stage, colors and graphic textures corresponding to the particles with completed condition simulation are displayed on the screen via a graphic function database (e.g., an OPEN GL function database). Thus, the text or graphics generated by the touch screen are recorded by the user and converted to particle system parameters, and are presented on the screen in a visual effect of the particle system. The particle parameters corresponding to the touch position coordinate are also recorded during the process to realize the foregoing visual effect positions and visual effect information.

It is to be noted that, a pixel is regarded as an initial position of a particle in this embodiment; however, since a user's finger generally covers a larger range than a single pixel on the touch screen, a plurality of pixels touched by a same-finger touch control of the user (i.e., pixels touched by the user within a predetermined time period) are regarded as a same initial position, so as to realize similar visual effect while reducing system resource consumption. More specifically, in the present disclosure, a plurality of coordinates are defined as one emitter to realize similar visual effects while reducing system resource consumption. Further, although a 2D coordinate plane is implemented for display, operations within the simulation stage are performed according to a 3D coordinate plane with respect to the particle system and projected to a 2D coordinate plane. To further reduce system resource consumption, the particle system may also perform the particle operations on a 2D coordinate plane.

With the embodiments above, it is illustrated that the present disclosure provides visual effects and interactivity to messages, so that the messages are offered with better flexibility, vividness and diversity to add amusement to the information world.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for providing a visual effect message in a communication system, the communication system comprising a transmitting end and a receiving end, the method comprising:
   inputting a user input message at the transmitting end, wherein the user input message is either a graph or a text comprising a plurality of letters;
   defining a plurality of visual effect positions in each letter of the text according to shape of the letter, or defining a plurality of visual effect positions in the graph according to shape of the graph;
   providing a plurality of visual effect information corresponding to each of the visual effect positions;
   transmitting the plurality of visual effect positions and the plurality of visual effect information from the transmitting end to the receiving end;
   rendering a visual effect message at the receiving end by displaying the plurality of visual effect information at each of the plurality of visual effect positions; and
   displaying the visual effect message at the receiving end.

2. The method according to claim 1, further comprising:
   encoding the visual effect information and the visual effect positions by the transmitting end into encoded information;

wherein, the step of transmitting the visual effect positions and the visual effect information to the receiving end comprises transmitting the encoded information to the receiving end.

3. The method according to claim 2, further comprising:
decoding the encoded information at the receiving end to retrieve the visual effect positions and the visual effect information from the encoded information;
displaying the visual effect information at the visual effect positions.

4. The method according to claim 1, wherein the visual effect positions respectively correspond to a plurality of coordinates on a coordinate plane.

5. The method according to claim 1, wherein the communication system is at least one of a GSM system, a CDMA/WCDMA system, an LTE system, a WiMAX system, and an Internet system.

6. A communication system for providing a visual effect message, comprising:
an input module, for inputting a user input message, wherein the user input message is either a graph or a text comprising a plurality of letters;
a visual effect editing module, for defining a plurality of visual effect positions in each letter of the text according to shape of the letter, or defining a plurality of visual effect positions in the graph according to shape of the graph, and further providing a plurality of visual effect information corresponding to each of the visual effect positions; and
a first communication module, for transmitting the plurality of visual effect positions and the plurality of visual effect information according to a communication protocol corresponding to the communication system to a receiving end, such that a visual effect message is rendered at the receiving end by displaying the plurality of visual effect information at each of the plurality of visual effect positions.

7. The communication system according to claim 6, wherein the receiving end comprises:
a second communication module, for receiving the visual effect positions and the visual effect information; and
a display module, for displaying a corresponding visual effect at the visual effect positions according to the visual effect information.

8. The communication system according to claim 7, further comprising a transmitting end, wherein the transmitting end comprises:
an encoding module for encoding the visual effect positions and the visual effect information into encoded information;
the first communication module transmits the encoded information when transmitting the visual effect positions and the visual effect information; and
the second communication module receives the encoded information when receiving the visual effect positions and the visual effect information.

9. The communication system according to claim 8, wherein the receiving end further comprises a decoding module for decoding the encoded information to retrieve the visual effect positions and the visual effect information from the encoded information, and the display module further displays the visual effect information at the visual effect positions.

10. The communication system according to claim 6, wherein the visual effect information is particle system mode visual effect information, and the visual effect positions respectively correspond to a plurality of coordinates on a coordinate plane.

11. The communication system according to claim 6, wherein the communication system is at least one of a GSM system, a CDMA/WCDMA system, an LTE system, a WiMAX system, and an Internet system.

12. A transmitting end in a communication system for providing a visual effect message, comprising:
a touch screen for inputting a user input message, wherein the user input message is either a graph or a text comprising a plurality of letters; and
a visual effect editing module coupled to the touch screen, for defining a plurality of visual effect positions in each letter of the text according to shape of the letter, or defining a plurality of visual effect positions in the graph according to shape of the graph, and further providing a plurality of visual effect information corresponding to each of the visual effect positions;
wherein, the touch screen displays a visual effect message, and the visual effect message is rendered by displaying the plurality of visual effect information at each of the plurality of visual effect positions.

13. The transmitting end according to claim 12, further comprising:
a first communication module, for transmitting the visual effect information according to a communication protocol corresponding to the communication system to a receiving end.

14. The transmitting end according to claim 13, wherein:
the transmitting end comprises an encoding module for encoding the visual effect positions and the visual effect information to encoded information;
the first communication module transmits the encoded information when transmitting the visual effect positions and the visual effect information; and
the second communication module receives the encoded information when receiving the visual effect positions and the visual effect information.

15. The transmitting end according to claim 12, wherein the visual effect information comprises particle system mode visual effect positions, and the visual effect positions respectively correspond to a plurality of coordinates on a coordinate plane.

16. The transmitting end according to claim 15, wherein a plurality of coordinates obtained from a same-finger touch control are defined as a same visual effect position.

17. The transmitting end according to claim 16, wherein the plurality of coordinates obtained from a same-finger touch control correspond to pixels touched by the user within a predetermined time period.

18. The transmitting end according to claim 15, wherein:
the visual effect information further comprises a lifespan parameter for the plurality of coordinates on the coordinate plane;
a frame update rate is determined for the plurality of coordinates on the coordinate plane; and
upon each update of the plurality of coordinates on the coordinate plane according to the frame update rate, all existing particles are checked to determine whether their lifespan parameter is exceeded.

19. The transmitting end according to claim 12, displaying the corresponding visual effect via two steps of:
calculating parameters of a plurality of particles generated at the visual effect positions on a frame according to the visual effect information; and drawing and displaying the particles on the frame via a graphics database according to the particle parameters.

20. The transmitting end according to claim 12, wherein the communication system is at least one of a GSM system, a CDMA/WCDMA system, an LTE system, a WiMAX system, and an Internet system.

21. The method according to claim 1, further comprising:
calculating coordinates of the visual effect positions along geometric coordinates of the user input message according to a predetermined algorithm, and providing a visual effect editing interface for providing a preview of the visual effect message by selecting parameters of visual effects.

22. The communication system according to claim 6, wherein the visual effect editing module is further capable of:
calculating coordinates of the visual effect positions along geometric coordinates of the user input message according to a predetermined algorithm, and providing a visual effect editing interface for providing a preview of the visual effect message by selecting parameters of visual effects.

23. The transmitting end according to claim 12, wherein the visual effect editing module is further capable of:
calculating coordinates of the visual effect positions along geometric coordinates of the user input message according to a predetermined algorithm, and providing a visual effect editing interface for providing a preview of the visual effect message by selecting parameters of visual effects.

* * * * *